(12) United States Patent
Brouwer

(10) Patent No.: US 6,437,708 B1
(45) Date of Patent: Aug. 20, 2002

(54) SYSTEM AND METHOD OF LAND MARKING

(75) Inventor: Frans P. Brouwer, Nanaimo (CA)

(73) Assignee: Top Link Ltd., Victoria (SC)

( * ) Notice: Subject to any disclaimer, the term of this patent is extended or adjusted under 35 U.S.C. 154(b) by 0 days.

(21) Appl. No.: 09/694,689

(22) Filed: Oct. 23, 2000

(30) Foreign Application Priority Data

Oct. 21, 1999 (CA) .............................................. 2287033

(51) Int. Cl.[7] .............................................. G08G 1/123
(52) U.S. Cl. ............... 340/988; 340/815.4; 342/357.06; 342/357.13; 244/137.1; 244/137.4; 441/6; 33/1 CC; 221/1; 221/2; 700/240
(58) Field of Search ............................... 340/988, 815.4; 342/357.06; 244/137.1, 137.4; 102/402; 144/335, 336, 4.1; 441/6, 7, 11; 33/440, 1 CC; 700/240; 221/1, 2, 4

(56) References Cited

U.S. PATENT DOCUMENTS

| | | | |
|---|---|---|---|
| 4,203,665 A | 5/1980 | Boulais ........................ 356/4.08 |
| 4,236,234 A | 11/1980 | McDavid et al. .............. 367/77 |
| 4,316,554 A | 2/1982 | Lloyd .......................... 221/232 |
| 4,396,942 A | 8/1983 | Gates .......................... 348/135 |
| 4,435,981 A | 3/1984 | Carson et al. ............. 73/382 R |
| 5,191,385 A | 3/1993 | Kasser ........................ 356/5.01 |
| 5,266,799 A | 11/1993 | Steinitz et al. .............. 250/253 |
| 5,402,340 A | 3/1995 | White et al. .................... 702/5 |
| 5,467,271 A | 11/1995 | Abel et al. ...................... 702/5 |
| 5,471,218 A | 11/1995 | Talbot et al. ........... 342/357.03 |
| 5,504,685 A | 4/1996 | Wapner ....................... 701/200 |
| 5,596,494 A | 1/1997 | Kuo .............................. 702/2 |
| 5,661,649 A | 8/1997 | Carson et al. .................. 702/2 |
| 5,708,230 A * | 1/1998 | Woodall, Jr. et al. ....... 102/402 |
| 5,739,785 A * | 4/1998 | Allison et al. ......... 342/357.02 |
| 5,748,136 A | 5/1998 | Fischer ......................... 342/33 |
| 5,841,026 A | 11/1998 | Kirk et al. ................ 73/178 R |
| 5,869,759 A | 2/1999 | Seigel ....................... 73/382 R |
| 5,951,346 A * | 9/1999 | Woodall, Jr. ................... 441/7 |
| 6,182,725 B1 * | 2/2001 | Sorvik ......................... 144/335 |
| 6,259,373 B1 * | 7/2001 | Ghahramani ............. 340/815.4 |

* cited by examiner

Primary Examiner—Benjamin C. Lee
(74) Attorney, Agent, or Firm—Pearne & Gordon LLP

(57) ABSTRACT

A system for an aerial land marking and surveying is disclosed. The system comprises an aircraft carrying a GPS receiver and a land marking device capable of physically marking a point on the ground identified by a computer program. A new method of an aerial land marking and surveying and a land-marking device for carrying out the method are also disclosed.

12 Claims, 7 Drawing Sheets

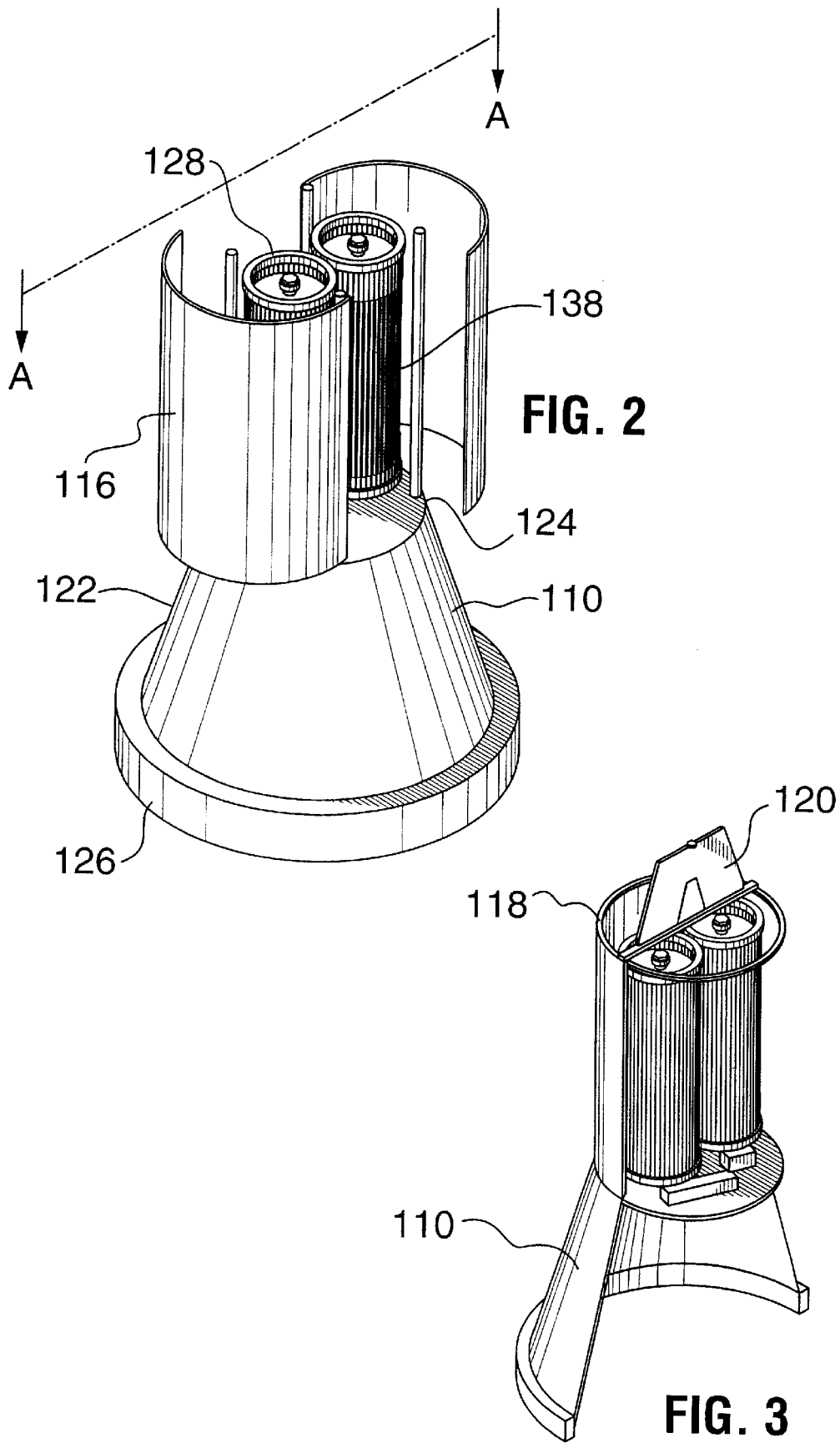

153

170

SYSTEM AND METHOD OF LAND MARKING

FIELD OF THE INVENTION

The invention relates to a new system and method of land marking.

BACKGROUND OF THE INVENTION

Most land surveys are performed utilizing either optical survey instruments or satellite-based Global Positioning System (GPS) survey equipment. In the case of an optical survey a line of sight must be secured in order to perform the survey. GPS receivers need relatively unobstructed signals from the satellite network or reference stations. However, in some terrain, maintaining a line of sight or signal quality can be difficult or impractical. Specifically, forested areas and hilly terrain provide examples of terrain that can present difficulties utilizing traditional methods of conducting the two types of surveys noted above.

In the case of forested area, ground-based land surveys using optical survey equipment or GPS satellites are difficult if not impossible in areas with trees or other vegetative cover. As such, forest cover must almost always be removed prior to the commencement of a survey of such an area. This requires use of hand-cutting or bulldozing, or a combination of the two. Further, it can be exceedingly expensive, require a significant amount of personnel on the ground and be relatively time consuming. Alternatively, while there are methods of avoiding the need to clear a survey area to provide a line of sight, these avoidance surveys are prohibitively time consuming when conducted through a forested areas. They fail, in most cases, to provide a cost-effective means of surveying and often provide unacceptable surveys accuracy.

Surveys through geographically hilly regions can also present difficulties. In these cases, alternate techniques that are relatively slow and costly must be employed to compensate for the inability to maintain a line of sight or a GPS reference station signal through such regions. The techniques include alternating optical survey methods, and, in some cases, incorporating inertial/GPS and barometric surveys.

Surveys encountering swamps or muskeg terrain conditions or other geographically difficult terrain including ditches, ravines, fence lines, streams or rivers, buildings etc. can be expensive, dangerous and/or time consuming. In the case of swamp or muskeg terrain, any planned surveys are, in many cases, postponed until the terrain of such areas has frozen. Of course, this further assumes that this is an environmental possibility in the area of interest.

In the case of geographic variability over a survey area, such as ditches, ravines, fence lines, streams or rivers, buildings, by way of example, a survey team must, at the same time, negotiate these obstacles during a survey. This slows the survey substantially.

The present invention provides a new system and method incorporating a land marking device for land marking that helps to address some of the disadvantages and limitations noted above.

SUMMARY OF THE INVENTION

It is an object of the present invention to provide a new system and method of land marking.

According to one aspect of the present invention, there is provided an aerial land marking system. The marking system comprises: a) an aircraft capable of hovering above a selected area on the ground; b) a land-marking device capable of being suspended from the aircraft, the land-marking device capable of marking a survey point on the ground, c) a GPS (global positioning system) receiver capable of being suspended from the aircraft and situated above the land-marking device when thus suspended, the GPS receiver being capable of receiving position data, and d) a computer communicatively connected to the GPS receiver and the land-marking device for calculating and storing coordinates of the marked survey point.

According to another aspect of the present invention, there is provided a method of aerial land marking. The method comprises steps of: a) positioning a land-marking device and a GPS receiver over a survey area by means of an aircraft, b) lowering the land-marking device and the GPS receiver such that the GPS receiver is situated above the land-marking device, c) activating the GPS receiver whereby the latter receives position data, d) securing a marker at or near a survey point of the survey area by using the land-marking device, and e) calculating and recording coordinates of the marked survey point.

One of many advantages of the system and method of land marking is that it provides a surveying system and method wherein a GPS signal may be maintained from the air and used to record a location of interest on the ground while the land marking device provides a marker at or near that location. This is useful in a forested, obstructed or hilly area survey area. Costs of such a survey should be reduced in so far as costs arising from the requirement to remove physical obstacles obstructing a line of sight or GPS signal quality are eliminated. For example, when surveying in a densely forested area, timber need not be cleared prior to the survey. This can result in savings on the order of several thousands of dollars per kilometer of surveyed area. Moreover, this results in significant environmental benefits as well as economic benefits. Also, the time required to conduct the survey through an area heavily forested or defined by hilly geography is greatly reduced.

Also, the method and system for aerially marking the ground using the subject invention is quicker and competitive with ground-based surveys where geographic obstructions arise on a survey site that slow ground-based crews. The use of the air-based land marking device will result in a survey that is not affected by difficulties in accessing and maneuvering through surveyed locations with obstacles, such as swamps, ravines, streams, buildings, fences, rivers, ditches, etc. The ground staking device is capable of laying out and recording a large amount of survey data in difficult or variable terrain in a relatively short time period when compared with conventional ground-based survey instruments. It is estimated that the land marking device, when used in association with an aircraft, provides for a surveying method wherein an area can be surveyed in a fraction of the time required to conduct a ground-based optical survey with little or no penalty in the accuracy of the resulting survey.

The land marking device can be utilized in many contexts, such as, by way of example, the oil and gas industry, civil engineering, mining and forestry. It can be applied, for example, to marking and/or surveying of boundaries, pipelines, oil/gas leases, seismic lines, open pit mines, roads, creek crossings, ordinary land features, etc. It can be used in all applications when land marking and/or surveying is carried out using traditional measuring and marking devices.

BRIEF DESCRIPTION OF THE DRAWINGS

The enclosed drawings illustrate one embodiment of the method for land marking.

FIG. 2 shows a perspective view of an embodiment of the land marking device with an exploded view of the external shell of the land marking device.

FIG. 3 shows a perspective, partial cut-away view of an embodiment of the land marking device along the line A—A from FIG. 2.

DETAILED DESCRIPTION OF THE PREFERRED EMBODIMENTS

In a preferred embodiment, the method of land marking incorporates a helicopter from which is suspended a land marking device and a GPS survey means. Utilizing the method allows marking the ground with a dowel or paint and recording that location using the GPS receiver. In operation, the pilot of the helicopter guides the land marking device with the aid of GPS survey techniques to a location to be surveyed. The land marking device is then lowered and the point of interest marked.

Figure 1:
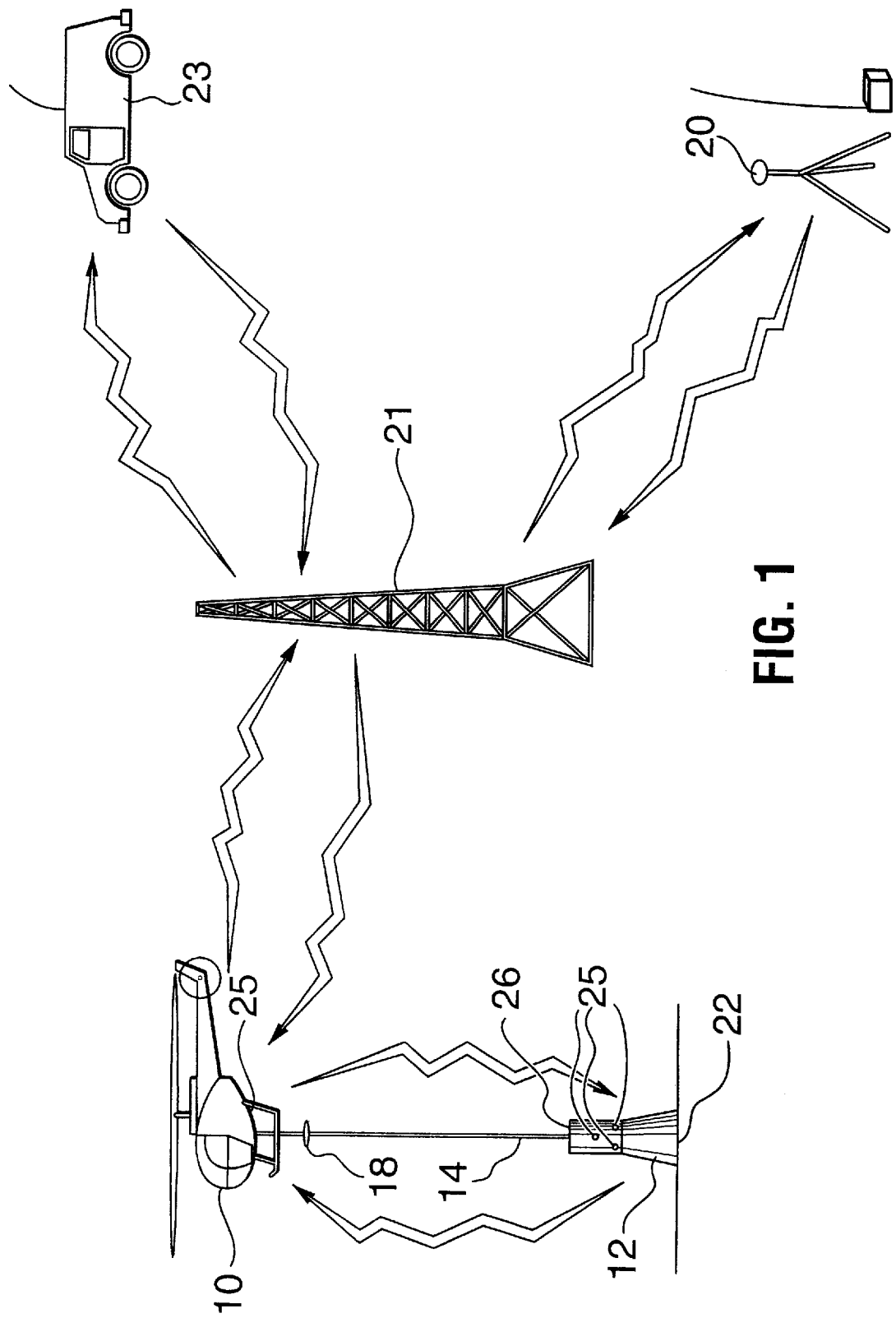
FIG. 1 shows an embodiment of the invention demonstrating the system and method of land marking.

Referring to FIG. 1, one embodiment of the invention is shown. The embodiment shows a helicopter 10 from which is suspended the land marking device 12. The land marking device 12 is suspended by a cord 14. In the embodiment shown, the land marking device 12 may be, by way of example, 150 meters below the base of the helicopter. Suspended below the helicopter by the same cord as that used to suspend the land marking device 12, is a GPS receiver 18. The GPS receiver 18 is preferably a distance beneath the helicopter and above the ground to allow it to receive a useful signal from GPS satellites as well as any reference location 20 or relay tower 21.

The cord 14 should be sufficiently long to allow the GPS receiver 18 to maintain a signal from GPS satellites and a reference station 20 or relay tower 21 while, at the same time, allow the land marking device 12 to be positioned on or near the ground point 22 to be marked depending on the geography of the survey region.

The data received from the reference station 20 allow for corrections to be made to the raw GPS data utilizing known techniques such as, by way of example, an RTK GPS system.

The cord 14 is made from material that is preferably resistant to rust and other environmental conditions and able to support the land marking device 12 in a stable manner during flight and when lowered into and out of a forested or other survey area. The land marking device 12 may be obstructed by branches, trees and other debris when lowered and lifted from the forest floor through forest canopy. As such it is preferable that the cord be able to sustain not only the weight of the land marking device but also the stresses applied when the land marking device is periodically and temporarily entangled in bogs, debris, branches or trees.

During operation, an operator or monitor of the land marking system may be situated in the helicopter 10 or on the ground. In the embodiment shown, the operator 23 is situated on the ground. The advantages of keeping the operator on the ground is that it allows for a smaller more economical helicopter to be used as the weight inside the helicopter is reduced without the operator.

During operation, the pilot of helicopter 10 flies a land marking device 12 to a location over, in the usual case, a pre-plot position on a pre-plot map of the survey region. The pilot then lowers the land marking device to a point over and near the pre-plot position. The pilot may lower the land marking device by a winching system from the helicopter or by lowering the helicopter itself, thereby lowering the land marking device.

Generally, the pilot determine the location of the land marking device from a monitor in the helicopter that displays the location of the land marking device from some surveying means. As the pilot generally knows where the pre-plot point of interest is located as well, he or she can then determine whether the land marking device is close enough to the point of interest to meet the requirement of the survey. Once the pilot is satisfied of this, he or she will, preferably, set the land marking device down in preparation for marking the point of interest. This may require, depending on the survey, negotiating the land marking device through canopy of a forested region or other difficult geographic terrain.

Note that an operator may also be monitoring the location of helicopter and, therefore, the location chosen by the pilot for securing a marking in regards to a pre-plot location. The operator may, depending on the criteria required of the survey, direct the pilot to secure a marker at a location or to adjust the location chosen to meet the survey requirements. As discussed below, the operator, may be remotely or otherwise in contact with the pilot and data collected by the various systems incorporated in the land marker an land marking system as to be able to better determine the quality of the location proposed by the pilot.

Once the land marking device is set down, the pilot will, depending on the accuracy required of the survey, adjust the helicopter's relative position in relation to the land marking device. He or she may also determine the status of the land marking device on the ground.

Where accuracy is a greater concern, a marker will preferably not be secured at or near the location of interest until the land marking device is relatively level on the ground. Otherwise, a marker will likely be sent from the land marking device on an angle and during the distance travelled from the land marking device to the location point, will end up being offset from the point of interest.

Inclinometers positioned in the land marking device help to ensure that the land marking device is relatively level when set down. Also a camera in the land marking device will ascertain how much light is leaking through bumper skirt. If the land marking device is fairly level to the ground, not much light should seep under the skirt. Also, in many cases the pilot will be able to visually see the land marking device and its ground position.

In the embodiment shown in FIG. 1, the land marking device 12 is positioned according to data received from the GPS receiver 18 that is suspended from the cord 14 at a distance above the land marking device and below the helicopter. These distances will depend on the survey in question and the geographical terrain being surveyed. However, as the GPS receiver provides the raw data from which the marker location is determined, it is desirable to determine the location of the GPS receiver relative to the land marking device. To do this, the component in the vertical direction can be ascertained by utilizing, in one embodiment a load meter. If the load meter shows some tension less than the weight of the land marking device and more than zero, then it may be presumed that the distance between the GPS receiver and the land marking device is the known length of cord between those two point. However, visual confirmation from the pilot is required. This distance can be added to the coordinates found for the GPS location at the location chosen by the pilot.

However, the helicopter may be offset from a line directly above the chosen location causing uncertainty in terms of the correction to be applied to the GPS data used in regards to the location point. One way of compensating for this error is for the pilot to maneuver the helicopter so that it is directly over the land marking device. This can be done visually or with the aid of accelerometers.

Accelerometers may be positioned on the helicopter and on the land marking device. These can then be used to determine the movement of the land marking device and helicopter. If the helicopter is offset from the line above the land marking device there will be a pull beyond a margin of error that will be registered on one or more the accelerometers.

An additional means of determining the relative location of the GPS receiver and the land marking device is to provide a signal to or from the GPS receiver to the land marking device or vice versa. These signals and receivers distributed along horizontal and vertical coordinates of the land marking device will provide the direct distance between the GPS receiver and land marking device and can be used utilizing standard triangulation techniques known in the art to determine the relative position of the land marking device.

Once the pilot is satisfied that the relative location of the GPS receiver is known with sufficient accuracy as required by a given survey, he of she, may then secure a marker into the ground from the land marking device.

At approximately the same time, a computer that is constantly receiving raw data from the GPS receiver, should, preferably, record the raw data from the GPS receiver. A computer program on the computer can then take that raw data which includes data from the satellite network available that can be used utilizing techniques known in the art to determine the location of the GPS receiver, data from the reference station that, based on techniques known in the art, can be used to improve on the accuracy of the satellites data provided, data from the land marking device, if any, that may include information about the pitch of the land marking device from the inclinometer, the readings from the accelerometers on the helicopter and land marking device, the load on the cord, and the like. The computer can then process this information to calculate and record a the location of the marker secured by adjusting the location found for the GPS receiver to add a coordinate to reflect the location of the marker utilizing the cord length between GPS receiver and the land marker and/or any additional radio or other signal data, if any, to determine the degree to which the GPS receiver is offset from the land marking device.

The pilot can then lift the land marking device from the marked location leaving the marker and, if necessary, move to a new location to be marked.

The computer program preferably records the coordinates of the marker in question such that the marker can be identified and matched with the coordinates provided.

A high degree of accuracy can be secured. Accuracy, is generally within decimeters of the true location however, it is dependent on the satellite network available at a given point in time, the information available in regards to the relative position of the GPS receiver and the land marking device, atmospheric conditions, and the like.

In an embodiment of the survey system and method, a ground-based operator may move through the survey region following the helicopter suspended land marking device 12. As such, the land marking device 12 may be better monitored prior to marking a location on the ground. The ground-based operator in this situation may be in remote communication with the pilot and the computer processing the survey information as well as the mechanism for triggering the marker within the land marking device.

Note again, the distance from the GPS receiver to the ground location can be fairly easily fixed by ensuring that the land marking device is relatively squarely located on the ground and that some tension remains in the cord. This can be done by utilizing a load meter, inclinometer, camera or other optical recording devices, etc. The load meter can record a some tension in the cord short of the actual weight of the land marking device. In the embodiment of the land marking device shown, a camera can determine whether the land marking device is firmly positioned on the ground by viewing the amount of light allowed into a bumper skirt included at the base of the land marking device. However, additional monitors may be utilized to more accurately determine whether the GPS is offset from a point directly above the location of interest. As mentioned above one means of doing this is by utilizing accelerometers 25 located at one or more points in or on the land marking device and on the helicopter. This relays information to the pilot to determine how far the GPS receiver is offset from the survey point 22 in the horizontal direction. As accelerometer detect movement, any offset of the helicopter from a line directly above the land marking device will, in many cases, cause movement in the helicopter and/or the land marking device. Such movement is relayed to the pilot and he or she is able to minimize it before choosing to deploy a marker. Once this is done, generally, the GPS data need be corrected in the vertical direction the length of the cord between the GPS receiver and the height of the land marking device, assuming the land marking device is positioned on the ground.

Alternatively, signals between the distance between the GPS receiver and the land marking device can determined at offset points on the land marking device, by way of example, away from the known cord distance line between the GPS receiver and the land marking device utilizing by way of example, radio signals and receivers. This information with the taut cord length between the land marking device and the GPS receiver, can be triangulated to determine the relative offset of the land marking device 12 and the GPS receiver 18. This information can then be used to more accurately correct the GPS location derived to determine the marker location. These may be optical (such as laser), acoustic, electromagnetic or other suitable signals.

Additionally monitors may be installed and utilized. Cameras or other monitoring equipment may be mounted to show the status of the land marking device 12. These may be mounted internal to the land marking device 12 or external to the land marking device 12. Such monitoring equipment includes, but is not limited to, information related to the number of markers remaining, the temperature of the paint housing where paint acts as the location marker, the status of a digital inclinometer on the land marking device.

The operator is preferably responsible for monitoring the progress of the land marking exercise generally. The operator, in the embodiment shown, would preferably be in remote communication in communication with the pilot as well as a computer responsible for collecting and processing data received during the course of a survey. As will be discussed below, the operator could monitor the progress of the survey where the computer, utilizing a computer program, would provide meaningful data in regards to the survey. This might include the data regarding the location of the last marker, the location of that marker relative to a pre-plot map of the survey area, the quality of the GPS signal available, the status of land marking device including the number of remaining markers, operational conditions of the land marking device from the various monitors that may be included in the land marking device. A ground-based or helicopter-based operator may utilize the system taught to monitor several helicopters at once across a survey plot. Moreover, the progress of a survey can be monitored by an operator referring to, preferably, a computer representation pre-plot of the survey region wherein the positions are graphically 'filled in' during the progress of the survey.

The land marking device will be described. In the embodiment shown, a dowel is ejected from the device that penetrates the ground such that the stake remains far enough out of the ground to allow it to provide a useful usually detectable location marker and far enough in the ground that it is adequately secured in the ground. In a second embodiment, a paint marker is directed to the ground where it stains the location of interest on the ground. The marked or surveyed coordinates are then recorded.

While the embodiment just described contemplates marking the ground with a dowel or paint, the invention is not limited to this means of marking alone. The land marking device can be designed to secure a marker on the ground that provides an acoustic, electromagnetic, radioactive or other suitable beacon. As long as the marker is detectable by visual, audio or other means and can be practicably secured by the land marking device onto or into the ground, it will serve its purpose as a land marker.

Figure 5:
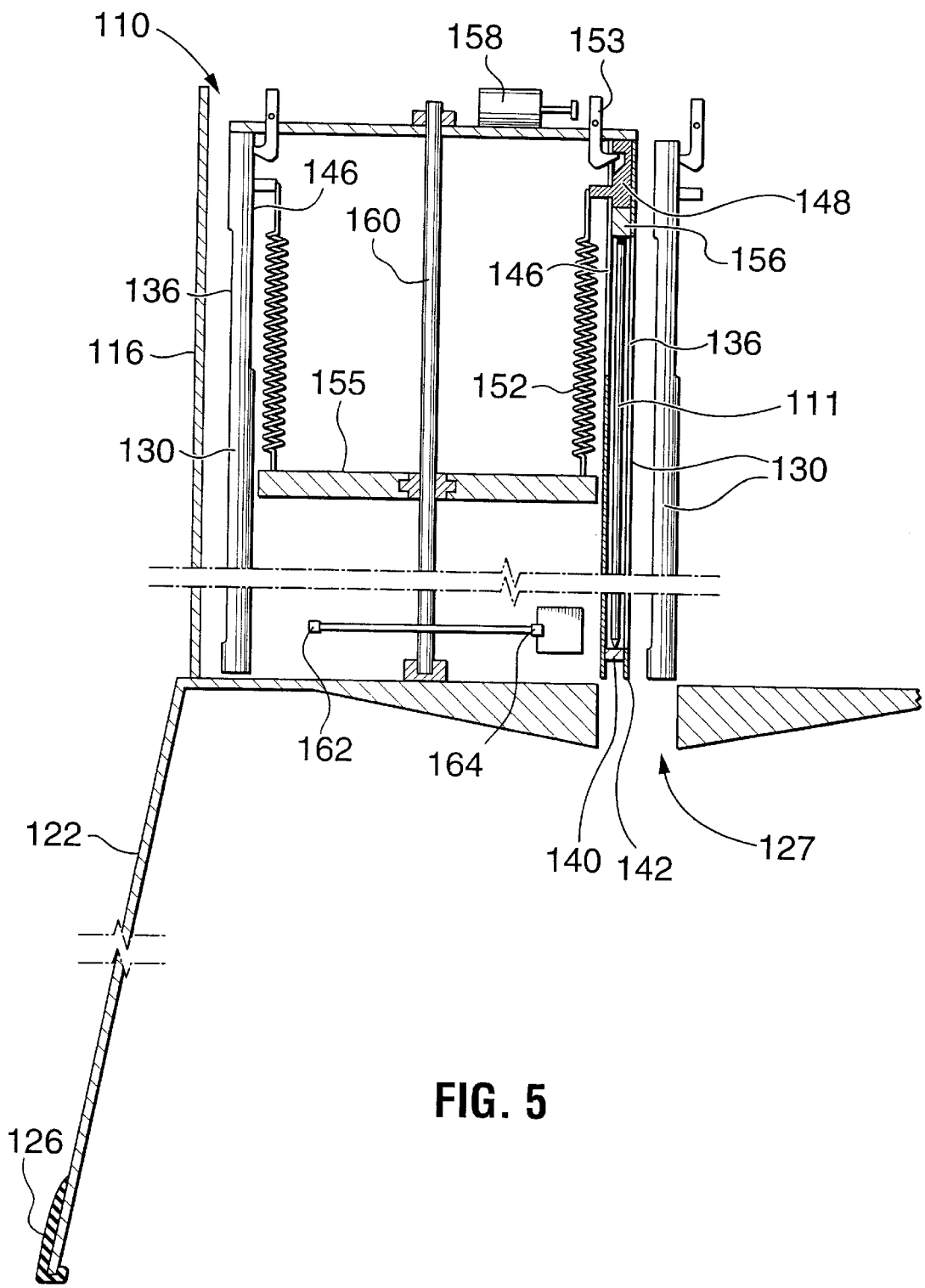
FIG. 5 shows a cross section of the land marking device along the line A—A from FIG. 2.

Referring to FIGS. 2, 3 and 5, a preferred embodiment of the land marking device 110 is shown. The land marking device 110 shown ejects a wooden dowel through a firing hole in the centre of the base of the device 110. The dowel travels into the ground from the height of approximately one meter. The dowel penetrates the ground to a depth that secures the dowel into the ground while, at the same time, maintaining a length of the dowel out of ground such that it remains visible to a ground based operator.

The land marking device 110 is enclosed in an aerodynamically designed external shell 116 which allows the device to hand stable on a long line, in full sight from the aircraft when suspended from a helicopter. The external shell 116 is generally cylindrical.

Figure 7:
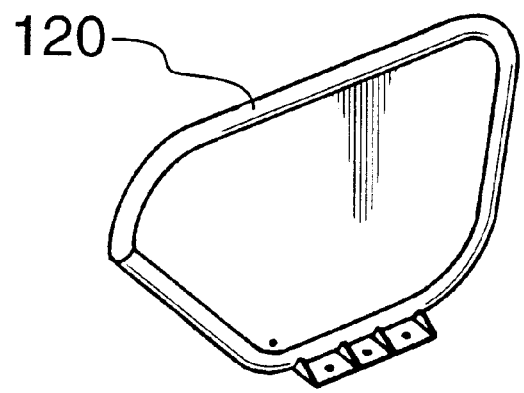
FIG. 7 is perspective view of the wing.

Referring to FIG. 3, a stabilizer is provided at the top part 118 of the external shell 116, to improve its aerodynamics and to ensure that the marking device 110 moves beneath and with the helicopter in a balanced fashion when suspended. In a preferred embodiment, as shown in FIG. 7, a wing assembly 120 acts as a stabilizer. The assembly 120 is secured to the shell 116 to help provide an aerodynamic ride to the land marking device 110 when in use. The present invention, is not limited to the wing assembly shown. Acceptable aerodynamics may be maintained without the use of a wing assembly.

Figure 8:
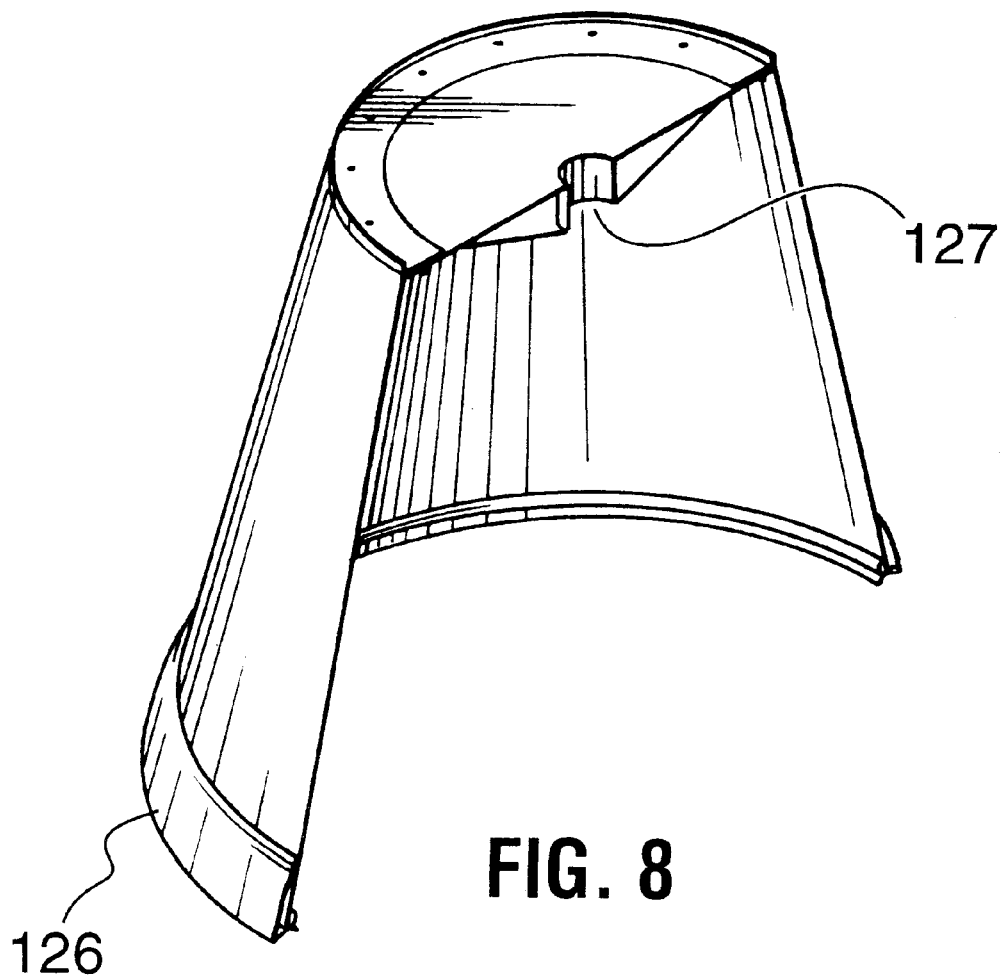
FIG. 8 is an perspective cross sectional view of the bumper skirt.

Referring to FIGS. 2 and 8, the land marking device 110 includes a bumper skirt 122 attached around the lower end 124 of the external shell 116 of the device 110. When the helicopter lowers the device towards the ground, the bumper skirt 122 protects the lower portion of the land marking device 110 from incidental impact occurring with the ground or trees and shrubs by absorbing the impact inevitable when the device is lowered through trees to the ground to mark a point on the ground. The bumper skirt 122 includes a bumper rim 126 to absorb ground impacts. Preferably, the rim is made of rubber, however, it may be made of other shock absorbing material.

Note on FIGS. 5 and 8, that the firing hole 27 is shown.

Figure 4:
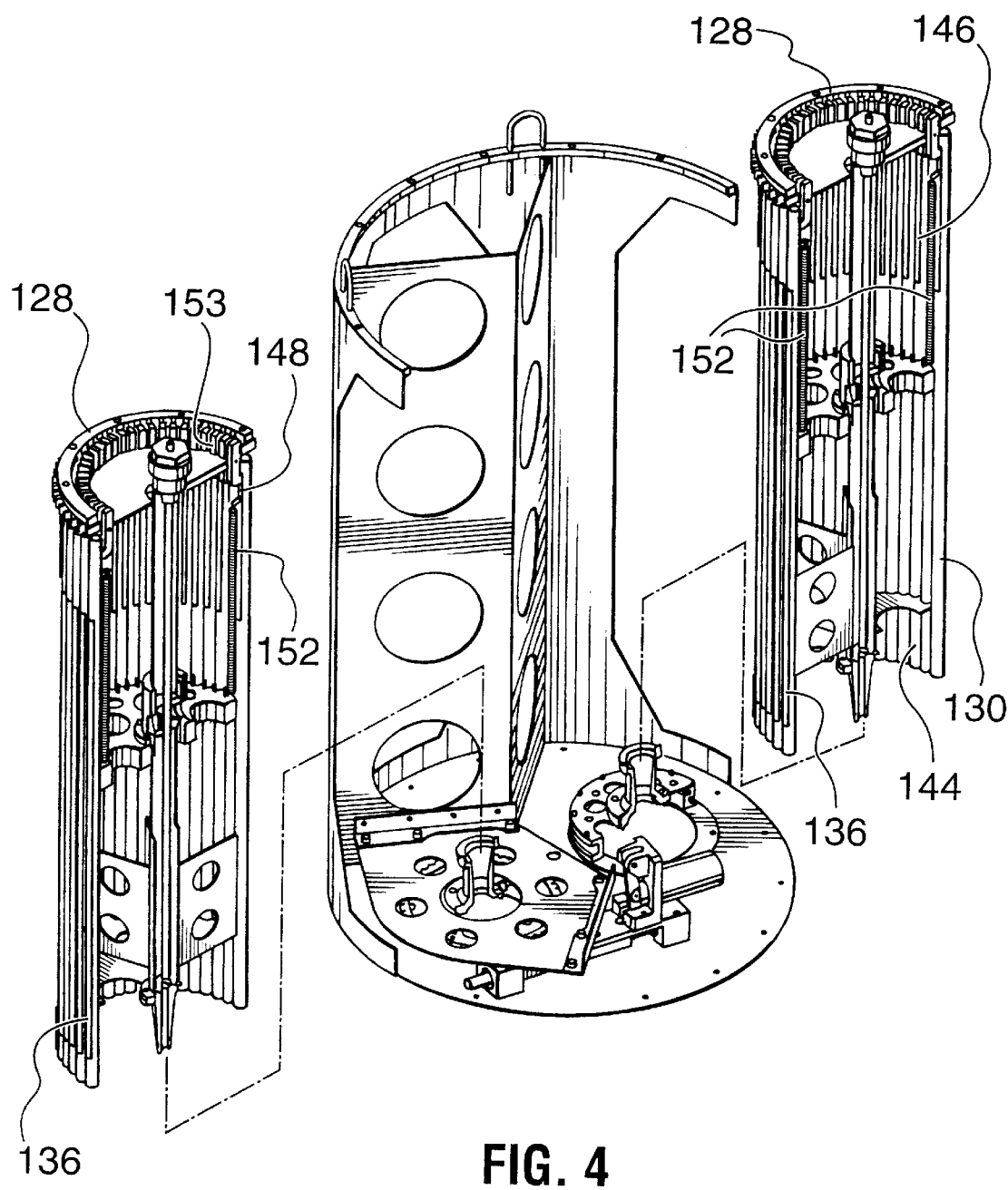
FIG. 4 shows a perspective, cut-away and exploded view of the external shell and barrels of an embodiment of the invention along the line A—A from FIG. 2.
Figure 6:
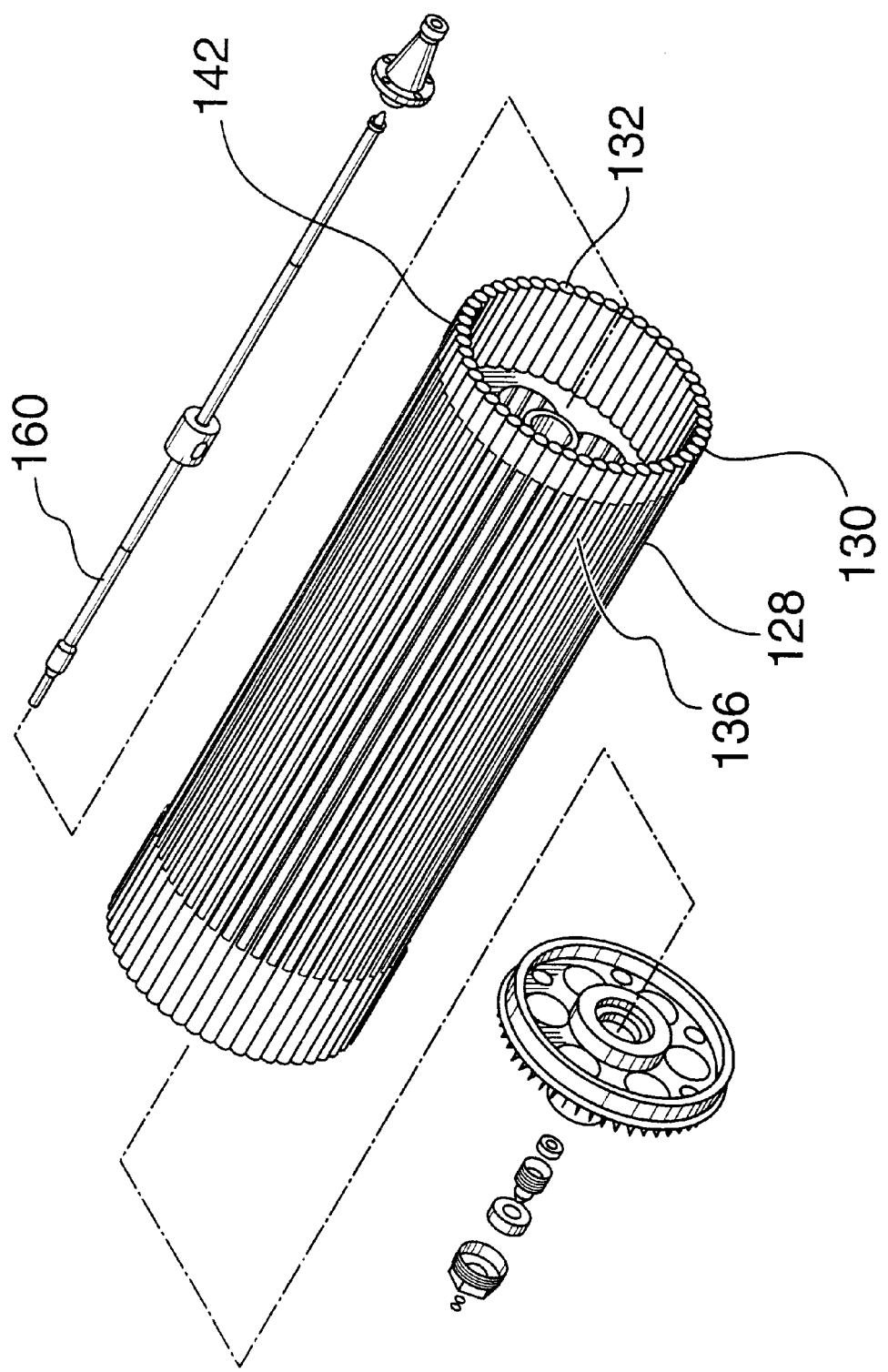
FIG. 6 is a perspective exploded view of the barrel.

Referring to FIGS. 2, 4 and 6, a preferred embodiment of the land-marking device 110 further contains one or more internal circular barrels 128 positioned inside the external shell 116. The internal barrels 128, which, in the embodiment shown, but not limited to the embodiment shown, are approximately 1 meter in height, consisting of a plurality of specially designed tubes 130 each holding disposable dowels used for land marking.

The tubes 130 are arranged on the outer perimeter of a disc 132 and form the barrel 128 in which the markers are housed and from which the markers are launched. In the embodiment shown, two barrels are arranged to meet each other, each made up of 50 tubes 130. Therefore, in the embodiment shown, 100 dowels are available between loadings.

The external shell 116 of an embodiment of the land marking device 110 has at least one access door. When opened, these doors provide access to the adjacent internal barrel or barrels 128 and its tube 130. Access may also be provided through the same door or one or many alternative doors, to electronics or other components housed in the shell.

Each tube 130 has a dowel-loading slot 136 cut out axially from the wall 138 facing the access door. The slot 136 is large enough to be used for inserting into the tube 130 a dowel. In the embodiment shown, the dowel is approximately 90 cm in length. The dowel may be retained in the tube 130 by a disk that may be made of, by way of example but not limited to, a strong paper or a similar material, which disk is inserted in a slot cut out radially at the lower end 142 of the tube 130.

Figure 9:
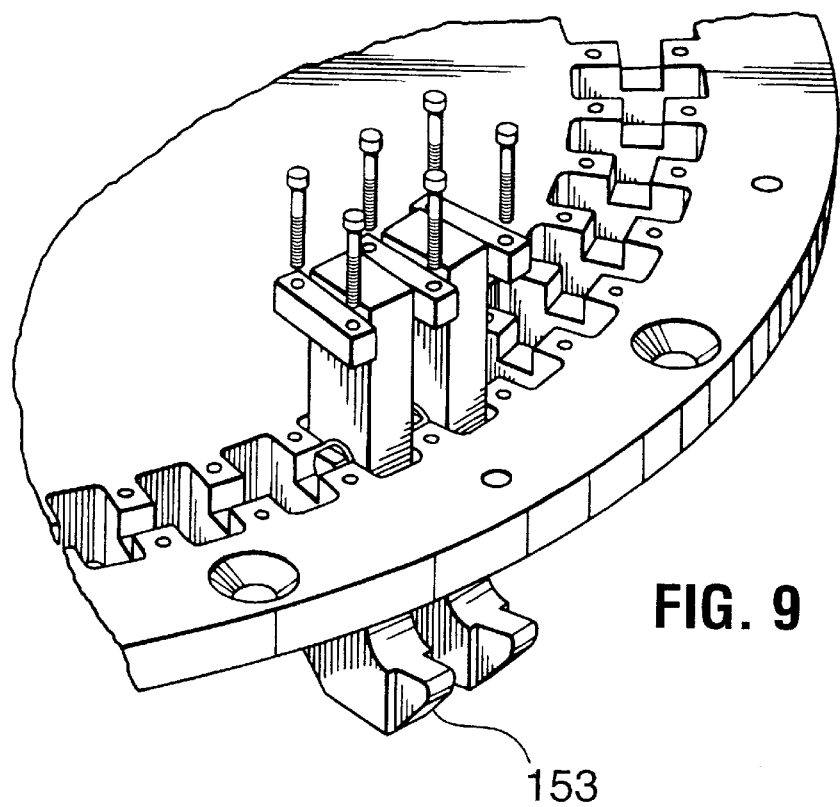
FIG. 9 is a close-up perspective view of the trigger means.

Referring to FIGS. 4, 5 and 9, on the side 144 opposite the dowel-loading slot 136, each tube has another narrow slot 146 cut out. This slot guides a hammer mechanism 148 axially along an upper length 150 of each tube 130. The hammer mechanism 148 is attached to a tensioning means that, in the embodiment shown, runs axially along each tube towards the inside of the barrel and adjacent to a given tube. In the embodiment shown the tensioning means is a steel spring 152. The hammer mechanism 148 and steel spring 152 are designed in such a manner that the hammer mechanism 148 can be tensioned and locked in the cocked position by a trigger arm 153 while the spring 152 is anchored to the tensioner assembly 155. In this cocked position, a hammerhead 156, which is part of the hammer mechanism 148 and which is positioned inside the tube 130 above the dowel, is ready to strike the top of the dowel.

The hammer mechanism 148 is activated by a solenoid 158. When the solenoid 158 is energized, it causes the tensioned hammer mechanism 148 to be released. The hammerhead 156 then strikes the top of the dowel. The impact of the hammerhead 156 ejects the dowel. The dowel perforates the disk 140. The solenoid is positioned such that it activates a single hammer mechanism. Only the dowel in the tube that is positioned above the firing hole 127 will be activated. As such, only this dowel will and can be ejected through the hole 127.

Of course, various different means can be employed to secure a marker into the ground beyond the spring hammer mechanism set out in the disclosure. These may include chemical reacted firing mechanism, hydraulic mechanisms, and others.

Generally, the tensioning means may be designed to eject the dowels at various velocities. The ejection force can be adjusted depending on the ground conditions (soft ground, hard ground, frozen ground, swamp, etc.).

Referring to FIGS. 5 and 6, the embodiment shown demonstrates that each barrel 128 of tubes 130 inside the external shell 116 is centered on an axial 160 and an indexing gear 162. Each indexing gear 162 is designed such that an index mechanism 164 can be utilized to advance each barrel 128 a specific distance. As such, one tube 130 from each barrel 128 lines up with the firing hole 112. The index mechanism 164 also prevents overshooting of the dowel and positions the dowel accurately over the firing hole 112 ensuring the accurate marking of the desired location.

Figure 10:
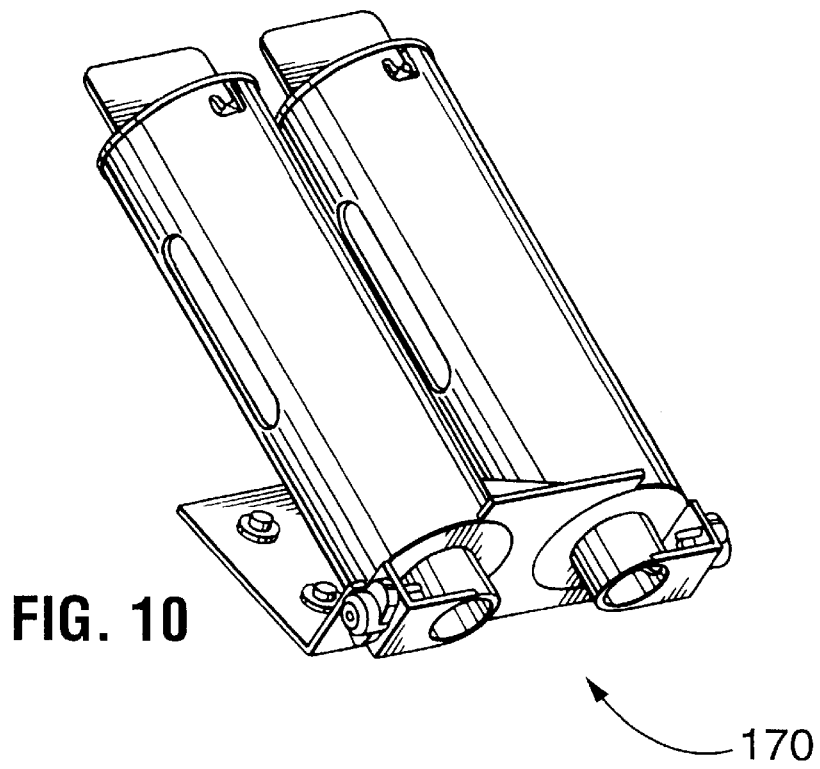
FIG. 10 is a perspective view of the paint receptacles.

Referring to FIG. 10, inside the land marking device 110, a space is provided for a compressed air cylinder and a receptacle 170 containing paint or other indelible marker. One such space may be the shirt. Here, the paint receptacle and cylinder are encased in a protective housing. A portion of the paint from the paint receptacle 170 may be ejected from the land marking device 110 by compressed air, using a provided discharge mechanism, to mark a location with paint as an alternative to marking with a dowel.

Both the barrels 128 and tubes 130 are housed in the shell 116 in such a manner that they are well protected. The air cylinders and paint receptacles 170 if inside the shell are also well protected. The bumper skirt 122 as well as the base 114 of the shell 116 protect the internal components of the land staking device 110 from sticks, trees or any other debris. The shell 116 is generally designed to protect the internal components from impacts during operation from the top and sides as well.

An inclinometer may be mounted on the land marking device 110. This is used to monitor the horizontal pitch of the land marking device 110 at any point during use. It is especially important when determining the pitch of the land-marking device just prior to marking a point. The land marking device needs to be relatively level prior to firing of the marker in order to ensure that the marker is accurately placed and properly secured at the desired location.

Other monitors may also be included in the land marking device. These might include information related to the number of markers remaining, the temperature of the paint housing, display of the hook or cord tension when supporting the marking device, the status of the digital inclinometer situated on the land marking device, status of the doors, etc. Generally, it is useful to have the monitors capable of remotely communicating with a computer on-board the aircraft and/or a ground-based operator.

A light may also be installed along with a camera within a bumper skirt. This can allow an operator to visually monitor whether the land marker accurately and adequately marked the location of interest before moving on to the next site. As the bumper skirt effectively blocks sunlight from entering and eliminates the location point, it is important that some means be provided to illuminate the area within the bumper skirt. An alternative means includes providing sunlight holes in the skirt to let sunlight illuminate the survey point.

The land marking device generally, should be constructed of the lightest and, at the same time, sturdiest material practicable. During use, the land marking device 110 encounters significant impact from trees and other debris and the ground. Also, given the varying environmental conditions in which the land marking device will be used, it is important that the device be made from material that resist rusting and other environmental conditions. Aluminum and stainless steel are preferably used however, other suitable materials may be substituted.

The overall design of the marking device ensures its reliable operation at extreme temperatures and in the presence of hostile environmental agents such as dust, moisture, etc. The device is lightweight in design and can be deployed with a medium sized helicopter. Moreover, it can be moved between various deployment places using almost any vehicle.

In order to provide further assistance, and purely for illustrative purposes, some specifications of one embodiment of the invention are provided below.

Key Dimensions of Land Marking Device

Shell Diameter: 0.715 m
Skirt Diameter (Base): 1.2 m
Spring Tension: 0–15 lbs
Dowel Capacity: 100 dowels
Construction Material: Aluminum Although various embodiments of the present invention have been described above for purposes of illustration, it would be apparent to those skilled in the art that numerous variations may be made thereto without departing from the spirit and scope of the invention, as defined in the appended claims.

What is claimed is:

1. An aerial land marking system, the system comprising:
 a) an aircraft capable of hovering above a selected area on the ground;
 b) a land-marking device capable of being suspended from the aircraft, the land-marking device capable of marking a survey point on the ground;
 c) a GPS (global positioning system) receiver capable of being suspended from the aircraft and situated above the land-marking device when thus suspended, the GPS receiver being capable of receiving position data; and
 d) a computer communicatively connected to the GPS receiver and the land-marking device for calculating and storing coordinates of the marked survey point.

2. The aerial land marking system of claim 1, further comprising a load meter for determining whether the aircraft, the GPS receiver and the land-marking device remain on a straight line.

3. The aerial land marking system of claim 1, further comprising an inclinometer for determining the horizontal pitch of the land-marking device and being operatively connected to the computer to enable the latter to calculate the coordinates of the marked survey point.

4. The aerial land marking system of claim 1, further comprising means for determining the relative position between the GPS receiver and the device and being operatively connected to the computer to enable calculation of the coordinates of the marked survey point.

5. The aerial land marking system of claim 1, further comprising a reference station for transmitting reference position data to the GPS receiver, the reference position data being used to calculate the coordinates of the marked survey point.

6. The aerial land marking system of claim 1, wherein said aircraft is a helicopter.

7. A method of aerial land marking, said method comprising the steps of:
- flying an aircraft carrying a land-marking device to a position above a location on the ground,
- lowering the land-marking device to a point proximate to the location on the ground,
- securing a marker from the land-marking device at a point on the ground,
- calculating and recording coordinates for the point on the ground.

8. A method according to claim 7, wherein the coordinates are calculated utilizing data provided by a GPS receiver.

9. A method of aerial land marking, the method comprising steps of:
- a) positioning a land-marking device and a GPS receiver over a survey area by means of an aircraft;
- b) lowering the land-marking device and the GPS receiver such that the GPS receiver is situated above the land-marking device;
- c) activating the GPS receiver whereby the latter receives position data;
- d) securing a marker at or near a survey point of the survey area by using the land-marking device; and
- e) calculating and recording coordinates of the marked survey point.

10. The method of claim 9, further comprising a step of determining the location of said GPS receiver relative to said land-marking device to calculate coordinates of the marked survey point.

11. The method of claim 9, further comprising a step of providing reference position data to the GPS receiver to more accurately calculate coordinates of the marked survey point.

12. The method of claim 9, wherein said aircraft is a helicopter.

* * * * *

UNITED STATES PATENT AND TRADEMARK OFFICE
CERTIFICATE OF CORRECTION

PATENT NO. : 6,437,708 B1
DATED : August 20, 2002
INVENTOR(S) : Frans P. Brouwer It is certified that error appears in the above-identified patent and that said Letters Patent is hereby corrected as shown below:

This certificate supersedes Certificate of Correction issued November 12, 2002, the number was erroneously mentioned and should be vacated since no Certificate of Correction was granted.

Signed and Sealed this

Eleventh Day of February, 2003

JAMES E. ROGAN
*Director of the United States Patent and Trademark Office*